Patented Sept. 13, 1932

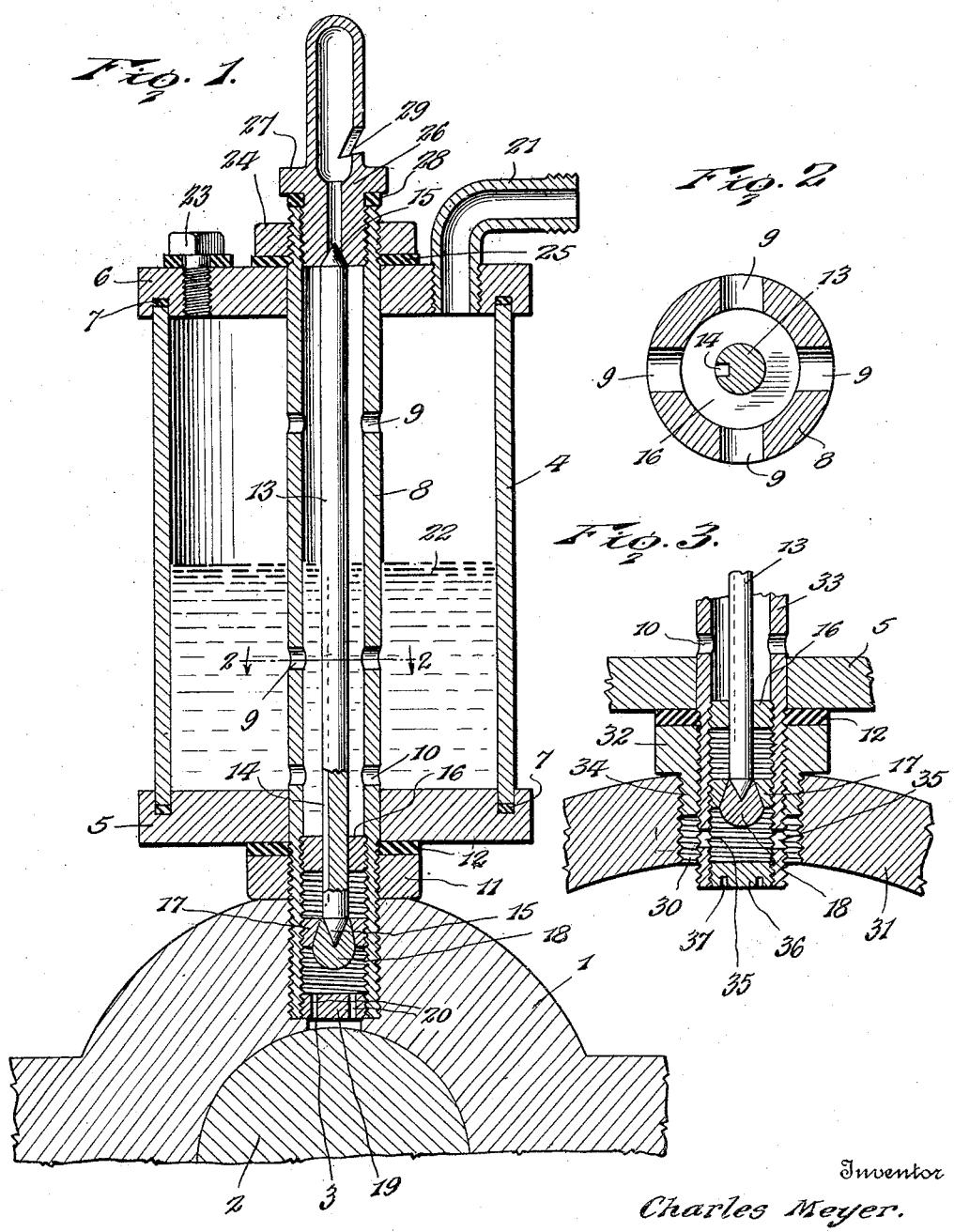

1,877,007

UNITED STATES PATENT OFFICE

CHARLES MEYER, OF MILWAUKEE, WISCONSIN

OILER

Application filed May 8, 1931. Serial No. 536,014.

This invention relates to devices for supplying lubricant to bearings, and the present invention is a supplemental oiling device which comes into operation when the main lubricating system of any machinery or power plant should, for any reason, fail to supply lubricant to any one bearing. The particular object of the invention is to arrange a device for holding a supply of lubricant adjacent a particular bearing and so constructed that should lubricant from the normal supply fail to reach the bearing so that the bearing becomes overheated, the hot air arising from the bearing will release a valve and permit flow of oil from the supplemental holder, at the same time operating a signal whereby the attendants will be notified of the condition. The invention is illustrated in the accompanying drawing and will be hereinafter fully described, the novel features being particularly pointed out in the appended claims.

In the drawing,

Figure 1 is a vertical sectional view through a device embodying the invention and showing the same mounted upon a bearing, Fig. 2 is an enlarged horizontal section on the line 2—2 of Fig. 1, and Fig. 3 is a detail section showing a slight modification.

The numeral 1 indicates a cap constituting the upper member of a bearing in which a journal, indicated at 2, is fitted to rotate. The cap may be of any known or approved design and is provided through its top with an opening 3, the upper portion of which is internally threaded, as clearly shown in Fig. 1. The oil container comprises a cylinder 4 which may be of metal or glass, and has its ends fitted in annular grooves or recesses provided therefor in the opposed faces of a base plate 5 and an upper cap plate 6, packing 7 of any approved type being fitted in the grooves against the edges of the cylinder to prevent leakage in an obvious manner. Plates 5 and 6 are provided with central openings therethrough, as shown in Fig. 1, and through these openings is fitted a tube 8 having openings 9 through its side at such intervals as may be deemed desirable, it being considered important that some openings, as indicated at 10, be provided immediately above the lower plate 5. The lower end of the tube 8 is threaded both internally and externally, and the external threads provide for engaging the same in the threaded opening in the bearing cap 1, whereby the tube may be firmly secured in the cap. A locking nut 11 is also preferably engaged upon the threaded lower end of the tube, and packing 12 is disposed between said nut and the under side of the base plate 5, as shown. Disposed concentrically within the tube 8 is a rod 13 having a longitudinal groove 14 in one side through its lower portion, and having its ends tapered, as shown at 15, whereby it will constitute a valve, as will presently more fully appear. Fitted within the lower end of the tube 8 and held therein by threaded engagement therewith is a plug 16 which fits closely around the rod 13 so as to guide the same and constitute a support for the lower end portion thereof. Below the plug 16, a second plug 17 is secured in the lower end of the tube in a similar manner, and this plug 17 carries a fusible block 18 of any approved material, such as soft metal having a low melting point. The lower end of the stem rests on this fuse and is normally supported thereby, as clearly shown in Fig. 1. The lower extremity of the tube 8 is closed by a third plug 19 having openings 20 therethrough whereby communication between the lower portion of the opening 3 and the interior of the tube is established.

The cap plate 6 is provided with a threaded opening in which is engaged one end of a pipe fitting 21 which is connected in any convenient or preferred manner with a source of pressure fluid, a very convenient arrangement being a hose or flexible connections extending between the fitting 21 and an air compressor. This fitting 21, of course, communicates with the interior of the cylinder 4 so that a supply of fluid under pressure may be maintained within the cylinder over the oil therein, indicated at 22. The cap plate is provided with a filling opening which is normally closed by a plug 23, so that a supply of oil may be readily fed into the container in an obvious manner. The upper end of the tube 8, which projects above the cap plate 6, is threaded both internally and externally, as shown in Fig. 1, and the external threads receive a nut 24 which is adapted to be turned home against the cap plate so that the tube will be firmly secured in the container, a gasket 25 being fitted between the nut and the cap plate so as to resist leakage. A tubular plug 26 is engaged in the upper end of the tube 8, and the lower end of the bore of this plug is flared so as to provide a seat for the upper tapered end of the rod or stem 13 whereby, normally, the plug will be closed to the interior of the container. This tubular plug is provided with an external rib or annular flange 27 adapted to rest upon the upper end of the tube 8 or upon a gasket 28 interposed between the tube and the rib, and the upper portion of the plug is formed into a whistle, as indicated at 29. It will now be readily understood that, normally, the stem 13 is clamped by and between the tubular plug 26 and the fuse 18 so that the flow of oil to the bearing will be cut off. A supply of compressed air or other fluid under pressure is admitted to the cylinder through the fitting 21 and bears constantly upon the upper surface of the lubricant. Should the normal supply of lubricant fail so that the bearing becomes overheated, the hot air arising from the bearing will pass through the openings 20 in the closure plug 19 and play upon the fuse 18 so that the latter will be melted, whereupon the stem 13 will drop by gravity and rest upon the said plug 19. When the stem drops, as just explained, its upper end will move out of engagement with the seat in the tubular plug 26, and the groove 14 in the stem will have its lower end disposed below the plug 17 and will constitute a by-pass to permit oil to flow past the plugs 16 and 17 and through the openings 20 to the overheated bearing. At the same time that the flow of oil to the bearing is thus set up, the pressure fluid will tend to escape with considerable velocity through the tubular plug and will sound the whistle 29 so that notice will be given attendants of the condition at the bearing equipped with my device. It will be understood, of course, that other forms of signals or alarms may be employed, and that the alarm may be a visual signal or an audible signal, as may be preferred.

In Fig. 3, I have shown a slight modification of the invention, in which the opening 30, through the bearing cap 31, is of somewhat greater diameter relatively than the opening 3 in the first described form of the invention. The nut 32 which is fitted upon the lower end of the tube 33 has a depending annular rim 34 which fits within the opening 30 so that the lower end of the tube will be spaced from the wall of the opening, as clearly shown. The lower end of the tube is provided with openings 35 therethrough below the plug 17, and the plug 36 which closes the lower end of the tube is imperforate, although it may be provided with notches or sockets 37 to be engaged by a turning tool. With this form of the invention, the hot air arising from an overheated bearing will flow into the space between the lower end of the tube and the wall of the opening 30 and then pass through the openings 35 to play upon the fuse 18, the action being otherwise identical with the action of the first described form.

Having thus described the invention, I claim:

1. A lubricating device comprising a container, means for securing the container upon a bearing, said means constituting an outlet from the container, means whereby communication may be established through the last mentioned means between the container and the bearing to which the device is fitted, a fuse normally cutting off said communication, and a valve normally supported by said fuse and arranged to establish a flow of lubricant from the container to the bearing when said fuse melts.

2. A device for the purpose set forth comprising a container, a tube extending through the container and in communication with the interior thereof, a signal in communcation with the upper end of said tube, a fuse at the lower end of the tube, a valve normally resting on the fuse and closing communication to the signal and arranged to open said communication when the fuse melts and simultaneously permit discharge of lubricant from the container, and means whereby fluid under pressure may be supplied to the container above the lubricant therein.

3. A device for the purpose set forth comprising a container, a tube extending through the container and having its ends projecting beyond the ends of the container, said tube being provided with openings through its wall within the container, means whereby a lubricant may be fed into the container, means whereby fluid under pressure may be supplied to the container above the lubricant, a plug fitted in the lower end of the tube, a second plug fitted in the lower end of the tube above the first mentioned plug and having a central opening, a fuse fitted in said opening, means whereby communication may be established between a bearing to which the device is fitted and the interior of the tube between said plugs, a tubular plug fitted in the upper end of the tube, and a valve stem having its lower end resting upon the fuse and its upper end normally seated in the bore of said tubular plug, said valve stem having a longitudinal groove in its side whereby to permit a discharge of lubricant when the fuse melts and the stem drops.

In testimony whereof I affix my signature.

CHARLES MEYER.